(12) United States Patent
Fujioka et al.

(10) Patent No.: US 10,022,981 B2
(45) Date of Patent: Jul. 17, 2018

(54) INK, INK CARTRIDGE, AND INK JET RECORDING METHOD

(71) Applicant: CANON KABUSHIKI KAISHA, Tokyo (JP)

(72) Inventors: Fumiaki Fujioka, Kawasaki (JP); Yoshihisa Yamashita, Kawasaki (JP); Yuko Negishi, Tama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/362,969

(22) Filed: Nov. 29, 2016

(65) Prior Publication Data

US 2017/0183525 A1    Jun. 29, 2017

(30) Foreign Application Priority Data

Dec. 28, 2015 (JP) ................... 2015-255631

(51) Int. Cl.
| | |
|---|---|
| *B41J 2/21* | (2006.01) |
| *B41J 2/175* | (2006.01) |
| *C09D 11/107* | (2014.01) |
| *C09D 11/322* | (2014.01) |
| *C09D 11/326* | (2014.01) |

(Continued)

(52) U.S. Cl.
CPC .......... *B41J 2/2107* (2013.01); *B41J 2/1752* (2013.01); *B41J 2/17503* (2013.01); *B41J 2/17513* (2013.01); *B41J 2/17553* (2013.01); *C09D 11/107* (2013.01); *C09D 11/322* (2013.01);
(Continued)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 11/0015; B41J 11/002; B41J 2/2056; B41J 2/21; B41J 2/0057; B41J 3/60; B41J 2002/012; B41J 2/04598; B41J 2/04586; B41J 2/04588; B41J 2/04595; C09D 11/36; C09D 11/40; C09D 11/30; C09D 11/38; C09D 11/322; C09D 11/328; C09D 11/101; C09D 11/005; C09D 11/54; C09D 11/52;
(Continued)

(56) References Cited

U.S. PATENT DOCUMENTS

| | | |
|---|---|---|
| 6,203,604 B1 | 3/2001 | Kashiwazaki et al. |
| 6,248,482 B1 | 6/2001 | Kashiwazaki et al. |

(Continued)

FOREIGN PATENT DOCUMENTS

| | | |
|---|---|---|
| JP | 2000-198955 A | 7/2000 |
| JP | 2003-535949 A | 12/2003 |

(Continued)

*Primary Examiner* — Manish S Shah
(74) *Attorney, Agent, or Firm* — Fitzpatrick, Cella, Harper & Scinto

(57) ABSTRACT

An aqueous ink for ink jet containing a self-dispersible pigment, a compound represented by General Formula (I):

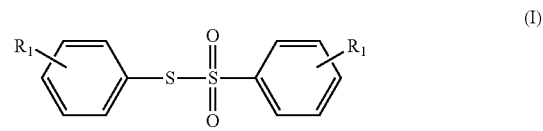

where in General Formula (I) each R1 independently represents a hydrogen atom or an alkyl group.

11 Claims, 2 Drawing Sheets

(51) Int. Cl.
*C09D 11/324* (2014.01)
*C09D 11/38* (2014.01)

(52) U.S. Cl.
CPC .......... *C09D 11/324* (2013.01); *C09D 11/326* (2013.01); *C09D 11/38* (2013.01)

(58) Field of Classification Search
CPC .... B41M 5/0011; B41M 5/0017; B41M 7/00; B41M 7/0072; B41M 5/52; B41M 5/5218
See application file for complete search history.

(56) References Cited

U.S. PATENT DOCUMENTS

| | | | |
|---|---|---|---|
| 6,280,513 | B1 | 8/2001 | Osumi et al. |
| 6,332,919 | B2 | 12/2001 | Osumi et al. |
| 6,852,156 | B2 | 2/2005 | Yeh et al. |
| 6,921,433 | B2 | 7/2005 | Kuribayashi et al. |
| 6,964,700 | B2 | 11/2005 | Uji et al. |
| 7,297,203 | B2 | 11/2007 | Takada et al. |
| 7,377,631 | B2 | 5/2008 | Takada et al. |
| 7,601,210 | B2 | 10/2009 | Fujioka et al. |
| 7,806,970 | B2 | 10/2010 | Fujioka et al. |
| 7,883,199 | B2 | 2/2011 | Hakamada et al. |
| 7,909,448 | B2 | 3/2011 | Iwata et al. |
| 7,909,449 | B2 | 3/2011 | Sato et al. |
| 8,011,777 | B2 | 9/2011 | Yamashita et al. |
| 8,469,504 | B2 | 6/2013 | Saito et al. |
| 8,475,580 | B2 | 7/2013 | Nagai et al. |
| 8,491,715 | B2 | 7/2013 | Gouda et al. |
| 8,985,755 | B2 | 3/2015 | Fujioka et al. |
| 2001/0020431 | A1 | 9/2001 | Osumi et al. |
| 2002/0014184 | A1 | 2/2002 | Yeh et al. |
| 2010/0034972 | A1 | 2/2010 | Mukae et al. |
| 2011/0104619 | A1* | 5/2011 | Fujii ................ B41M 5/3336 430/467 |
| 2012/0190868 | A1* | 7/2012 | Miyata ................ C07D 495/04 549/41 |
| 2012/0268536 | A1* | 10/2012 | Saito ................ B41J 2/2107 347/96 |
| 2013/0027463 | A1 | 1/2013 | Ogasawara et al. |
| 2016/0152849 | A1 | 6/2016 | Nagai et al. |
| 2016/0280945 | A1 | 9/2016 | Mukae et al. |

FOREIGN PATENT DOCUMENTS

| | | |
|---|---|---|
| JP | 2006-008899 A | 1/2006 |
| JP | 2006-045514 A | 2/2006 |
| WO | 01/02351 A2 | 1/2001 |

\* cited by examiner

INK, INK CARTRIDGE, AND INK JET RECORDING METHOD

BACKGROUND OF THE INVENTION

Field of the Invention

The present invention relates to an ink, an ink cartridge, and an ink jet recording method.

Description of the Related Art

The recording speed of ink jet recording apparatuses has been dramatically improved as a result of the technical advance. Such ink jet recording apparatuses have been gradually introduced into the field of business document printing in place of laser recording apparatuses. Ink jet recording apparatuses typically use, as inks for texts to be used for recording images on recording media such as plain paper, aqueous inks containing self-dispersible pigments as a coloring material in consideration of high optical density.

In order to improve the optical density of images to be recorded and image qualities such as character quality, various components have been studied for the aqueous inks containing self-dispersible pigments as a coloring material. For example, an ink enabling recording of high quality images has been disclosed. The ink includes a water-soluble organic solvent that is unlikely to stably disperse a self-dispersible pigment to destabilize the dispersion state of the pigment after evaporation of liquid components (Japanese Patent Application Laid-Open No. 2006-045514). Another ink enabling recording of high quality images has been disclosed. The ink includes a monovalent cation salt to destabilize the dispersion state of a pigment after evaporation of liquid components (Japanese Patent Application Laid-Open No. 2000-198955).

However, the results of studies by the inventors of the present invention have shown that some aqueous inks containing a self-dispersible pigment as a coloring material cannot maintain the storage stability. In particular, as the application field of the ink jet recording method has been rapidly spread, inks are required to have much higher quality and also to have higher storage stability as compared with conventional inks.

An object of the present invention is thus to provide an aqueous ink containing a self-dispersible pigment as a coloring material but having markedly higher storage stability as compared with conventional inks. The present invention is also directed to provide an ink cartridge including the aqueous ink and an ink jet recording method using the aqueous ink.

SUMMARY OF THE INVENTION

The above object is achieved by the following present invention. In other words, the present invention provides an aqueous ink for ink jet containing a self-dispersible pigment, and the aqueous ink includes a compound represented by General Formula (I).

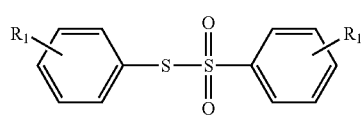
(I)

(In General Formula (I), each $R_1$ independently represents a hydrogen atom or an alkyl group.)

The present invention can provide an aqueous ink containing a self-dispersible pigment as a coloring material but having markedly higher storage stability as compared with conventional inks. The present invention can also provide an ink cartridge including the aqueous ink and an ink jet recording method using the aqueous ink.

Further features of the present invention will become apparent from the following description of exemplary embodiments with reference to the attached drawings.

BRIEF DESCRIPTION OF THE DRAWINGS

FIG. 2A is a perspective view of a principal part of the ink jet recording apparatus; and FIG. 2B is a perspective view of a head cartridge.

DESCRIPTION OF THE EMBODIMENTS

Figure 1:
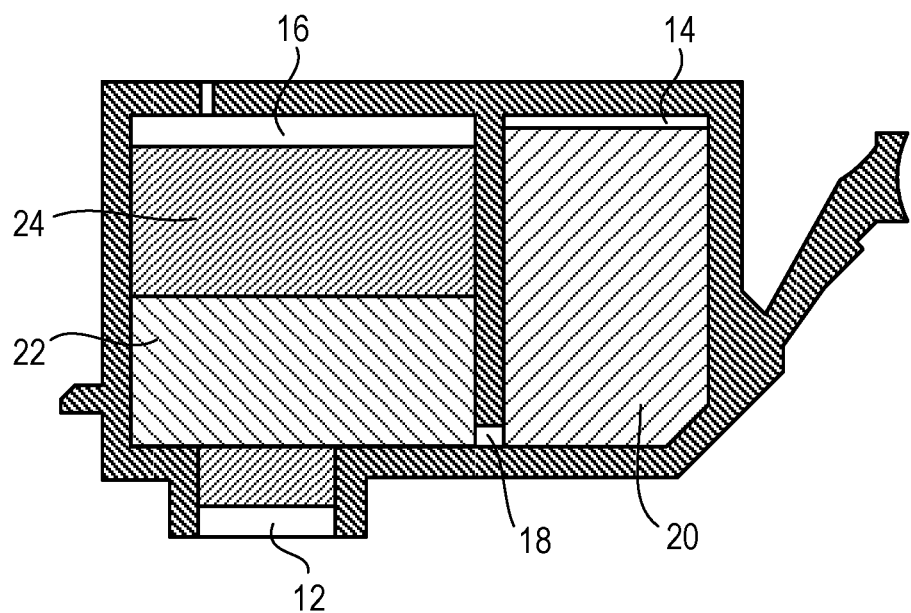
FIG. 1 is a schematic sectional view illustrating an embodiment of an ink cartridge of the present invention.

Preferred embodiments of the present invention will now be described in detail in accordance with the accompanying drawings.

Embodiments of the present invention will now be described, but the present invention is not intended to be limited to the following embodiments. In the present invention, salts or anionic groups in a salt form can dissociate into ions in an ink, but are expressed as "salts" or "anionic groups" for convenience. A self-dispersible pigment and an aqueous ink for ink jet may also be simply called "pigment" and "ink". Various physical property values in the present specification are the values determined at normal temperature (25° C.) unless otherwise noted. The ink of the present invention is an aqueous ink, and thus the unit "mmol/kg" in the present invention is calculated where the ink has a specific gravity of "1 g/mL".

The inventors of the present invention have found that an ink containing a self-dispersible pigment as a coloring material but containing a compound represented by General Formula (I) has markedly higher storage stability as compared with conventional inks. The inventors of the present invention suppose that such an effect can be achieved by the following mechanism.

The self-dispersible pigment is prepared by bonding a hydrophilic group such as an anionic group or a functional group containing a hydrophilic group (hereinafter also collectively referred to as "functional group") to the surface of pigment particles in order to disperse intrinsically hydrophobic pigment particles in an aqueous medium. However, the functional group does not completely cover the particle surface of the pigment, and thus there is an area where the pigment particle surface is exposed (hydrophobic portion). The exposed area of the pigment particle surface is hydrophobic, and thus the pigment particles may aggregate due to hydrophobic interaction depending on the composition of an ink or the storage environment of an ink. This may destabilize the dispersion state of the particles to deteriorate the storage stability of an ink.

As a conventionally known technique for pseudo hydrophilization of the particle surface of a hydrophobic pigment, a resin or a surfactant is added. However, the resin is a polymer compound and thus has a large molecular size. On this account, the resin is unlikely to enter fine clearances among the functional groups of a self-dispersible pigment and to be adsorbed to the hydrophobic portion, and thus it is difficult to exert an intended effect. In addition, when the resin is excessively added, some portion of the resin fails to be adsorbed to the hydrophobic portion of the particle surface of a pigment and prevents the pigment from aggregating on a recording medium. This impairs the advantageous effect obtained by using a self-dispersible pigment. Meanwhile, when a surfactant having a comparatively small molecular weight is used, the surfactant enters clearances among the functional groups of a self-dispersible pigment and is readily adsorbed to the hydrophobic portion. However, the surfactant has high hydrophilicity and thus is readily dissolved in water. On this account, even when adsorbed to the particle surface (hydrophobic portion) of a pigment, the surfactant is readily released. The storage stability of an ink is thus difficult to improve.

Hence, the inventors of the present invention conducted further studies focusing on hydrophobic compounds that can be certainly adsorbed to the particle surface of a pigment. As a result, it have been found that by using a compound represented by General Formula (I), an ink having markedly excellent storage stability can be produced. The inventors of the present invention suppose that such an effect can be achieved by the following mechanism.

The compound represented by General Formula (I) does not have a structure undergoing ionic dissociation, thus is basically a hydrophobic compound, and is effectively adsorbed to the hydrophobic portion on the particle surface of a pigment. However, simple protection of the hydrophobic portion with a hydrophobic compound cannot reduce the aggregation of a pigment due to hydrophobic interaction. Meanwhile, the compound represented by General Formula (I) has a sulfonyl group having extremely high polarity in the molecule thereof, and the sulfonyl group is polarized in such a manner that the sulfur atom has $\delta^+$ and each of two oxygen atoms has $\delta^-$. In other words, it is supposed that the $\delta^-$ polarized part of the sulfonyl group in the compound represented by General Formula (I) exhibits hydrophilicity, thus the adsorbed portion obtains higher hydrophilicity, and the pigment can be prevented from aggregating.

In addition, the compound represented by General Formula (I) is a compound having two benzene rings mutually connected through an —S—S(=O)$_2$— group in the molecule thereof and thus exhibits the effect of specifically improving the storage stability of an ink. In contrast, a compound having three or more benzene rings in the molecule thereof insufficiently exhibits the effect of improving the storage stability of an ink. This is supposed to be because a compound having three or more benzene rings in the molecule has a large molecular weight, is sterically bulky, and is difficult to enter clearances among the functional groups of a self-dispersible pigment. From the viewpoint of the hydrophobicity, a compound having a structure such as an alkyl group in place of benzene rings is supposed to give a similar effect, however, the similar effect could not be obtained against the prediction. A benzene ring has higher hydrophobicity as compared with an alkyl group, has a compact molecular size, and thus is supposed to be more readily adsorbed to the hydrophobic portion on the particle surface of a pigment.

It has also been revealed that when the compound represented by General Formula (I) is used, the storage stability of an ink is markedly improved as compared with when a compound having a sulfonyl group (—SO$_2$—) but having no thioether group (—S—) is used. This is supposed to be because the presence of a thioether group as a linking group increases the degree of freedom of a sulfonyl group in the molecule and the compound is likely to exhibit the polarity at a place apart from the particle surface of a pigment. It has also been revealed that when a compound having a carbonyl group (—C(=O)—) in place of an —S—S(=O)$_2$— group is used, the storage stability of an ink is not sufficiently improved. This is supposed to be because an —S—S(=O)$_2$— group has higher thermal stability than that of a carbonyl group (—C(=O)—) and thus exhibits an effect on the storage stability under harsher conditions such as long-time storage.

Aqueous Ink

The aqueous ink of the present invention is an aqueous ink for ink jet containing a self-dispersible pigment and a compound represented by General Formula (I). The ink of the present invention is not necessarily what is called "curable ink". Thus, the ink does not necessarily contain a compound that is polymerizable by application of external energy, such as a polymerizable monomer. Components constituting the ink of the present invention, physical properties of the ink, and the like will next be described in detail.

Self-Dispersible Pigment

The self-dispersible pigment contained in the ink of the present invention has a functional group that is bonded to the particle surface of the pigment. More specifically, an anionic group is bonded to the pigment particle surface directly or through another atomic group.

Functional Group

The functional group bonded to the pigment particle surface is an anionic group or a group constituted by combining another atomic group with an anionic group. Examples of the anionic group include a carboxylic acid group, a sulfonic acid group, a phosphoric acid group, and a phosphonic acid group. Such an anionic group may form a salt. When an anionic group forms a salt, at least one of the protons on the group is replaced by a cation. Examples of the cation include an alkali metal ion, an ammonium ion, and an organic ammonium ion. Examples of the alkali metal ion include ions such as a lithium ion, a sodium ion, and a potassium ion. Examples of the organic ammonium ion include cations of aliphatic amines such as mono- to tri-alkylamines; cations of aliphatic alcohol amines such as mono- to tri-alkanolamines; and salts thereof. The anionic group is particularly preferably in the form of an alkali metal salt such as a sodium salt and a potassium salt or in an ammonium salt form.

Examples of said another atomic group include alkylene groups such as a methylene group, an ethylene group, and a propylene group; arylene groups such as a phenylene group, a naphthylene group, an anthracenylene group, a phenanthrenylene group, and a biphenylene group; heteroarylene groups such as a pyridylene group, an imidazolylene group, a pyrazolylene group, a pyridinylene group, a thienylene group, and a thiazolylene group; a carbonyl group; ester groups such as a carboxylate ester group, a sulfonate ester group, a phosphate ester group, and a phosphonate ester group; an imino group; an amido group; a sulfonyl group; and an ether group. Said another atomic group may be a combination group of them. As compared with a self-dispersible pigment having an anionic group bonded directly to the pigment particle surface, a self-dispersible pigment having an anionic group bonded to the pigment particle surface through another atomic group is preferably used. The pigment particle surface has various conditions, and accordingly the anionic group directly bonded to the particle surface has various conditions. Thus, the anionic group susceptible to oxidation is likely to be formed. On this account, the self-dispersible pigment having an anionic group directly bonded to the pigment particle surface may consequently become a self-dispersible pigment susceptible to oxidation. This is the reason for the above-mentioned preferable use. In addition, the self-dispersible pigment having an anionic group bonded to the pigment particle surface through another atomic group has an advantage of capable of further improving the optical density of an image to be recorded and thus is preferably used.

The self-dispersible pigment is preferably a self-dispersible pigment having an anionic group that is bonded to the pigment particle surface through another atomic group. Specifically, the functional group bonded to the pigment particle surface is particularly preferably a phthalic acid group.

Pigment Species and Physical Property Values

As for the pigment constituting the self-dispersible pigment (pigment species), for example, an inorganic pigment such as carbon black, calcium carbonate and titanium oxide, or an organic pigment such as azo, phthalocyanine and quinacridone may be used. Among these, carbon black or the organic pigment is favorably used, and carbon black is particularly favorably used as the pigment because it has more reaction active points on its particle surface than other pigments, and so the introduced amount of the functional group is easy to be increased. As carbon black, any carbon black such as furnace black, lamp black, acetylene black and channel black may be used.

The DBP oil absorption of carbon black is favorably 50 ml/100 g or more and 200 ml/100 g or less, more favorably 120 ml/100 g or more and 170 ml/100 g or less, particularly favorably 120 ml/100 g or more and 150 ml/100 g or less. The DBP oil absorption can be measured by a method conforming to JIS K 6221 or ASTM D 2414. These methods are those in which dibutyl phthalate is added dropwise to 100 g of carbon black under agitation, and then the amount of dibutyl phthalate added is measured at the point of time of the maximum torque.

The specific surface area of carbon black according to the BET method is favorably 100 m$^2$/g or more and 600 m$^2$/g or less. The specific surface area according to the BET method can be measured by a method conforming to JIS K 6217 or ASTM D 6556. These methods are those in which deaerated carbon black is immersed in liquid nitrogen, and then the amount of nitrogen adsorbed on a particle surface of carbon black is measured when having reached the equilibrium.

The primary particle size of carbon black is favorably 10 nm or more and 40 nm or less. Carbon black is generally present in such a state that plural primary particles sterically extend like a bunch of grapes. The primary particle size means a particle size of carbon black (primary particle) of the smallest unit forming one pigment particle. The primary particle size of carbon black can be determined by observing and measuring the particle size of carbon black of the smallest unit forming the pigment particle at about 100 points through a transmission or scanning type electron microscope and calculating the arithmetical mean thereof.

The average particle size of carbon black is favorably 50 nm or more and 200 nm or less. The average particle size means a particle size of carbon black as an ordinarily existing form. In the present invention, the average particle size can be measured as a 50% cumulative value [$D_{50}$ (nm)] in a volume-based particle size distribution by using a dynamic light scattering type particle size distribution measuring device or the like.

The primary particle size of the organic pigment is favorably 50 nm or more and 150 nm or less. In addition, the average particle size of the organic pigment is favorably 50 nm or more and 250 nm or less. The definitions of the primary particle size and average particle size of the organic pigment are the same as the definitions of the primary particle size and average particle size of carbon black, respectively.

When a pigment has an excessively large or excessively small particle diameter, the measurement of surface charge amount by colloidal titration may be affected by the particle diameter. In order to improve the measurement accuracy and to achieve a high level of ejecting performance as an ink for ink jet, the pigment preferably has an average particle diameter ($D_{50}$) of 60 nm or more to 120 nm or less. The pigment preferably has a $D_{90}$ (90% cumulative value in the particle size distribution in terms of volume) of 100 nm or more to 300 nm or less.

Content

In the ink, the content (% by mass) of the self-dispersible pigment is preferably 0.10% by mass or more to 15.00% by mass or less and more preferably 1.00% by mass or more to 10.00% by mass or less based on the total mass of the ink.

Production Method of Self-Dispersible Pigment

The production method of a self-dispersible pigment is roughly classified into an oxidation type and a surface-modification type. The self-dispersible pigment used in the aqueous ink of the present invention may be produced by any method.

The oxidation type production method of a self-dispersible pigment can be exemplified by a method of oxidizing a pigment with an oxidant such as hypochlorous acid; a method of oxidizing a pigment with ozone in water; and a method of oxidizing a pigment with an oxidant after ozone treatment. The surface-modification type production method of a self-dispersible pigment can be exemplified by a method of chemically treating a pigment with a compound capable of generating a diazonium salt, a diazene compound, a substituted triazine compound, or a compound having an anionic group as a treatment agent. Examples of the compound having an anionic group to be used as a treatment agent include the compounds represented by General Formulae (1), (2), and (3). When a self-dispersible pigment is produced by oxidation, a functional group susceptible to oxidation, such as aldehyde and ketone, is likely to be formed during the oxidation of the pigment particle surface. On this account, a self-dispersible pigment produced by the surface-modification type production method is preferably used. In particular, this method enables efficient production of a self-dispersible pigment that has an anionic group bonded to the pigment particle surface through another atomic group and thus is preferred.

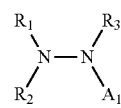

(1)

(In General Formula (1), $R_1$, $R_2$ and $R_3$ are, independently of one another, a hydrogen atom, a group having at least one of an aliphatic group and an aromatic group, a carboxylate ester group or —S(=O)$_2$—R$_4$, with the proviso that $R_1$, $R_2$ and $R_3$ are not hydrogen atoms at the same time, $R_4$ is a hydroxy group or a group having at least one of an aliphatic group and an aromatic group, and $A_1$ is selected from the group consisting of a carboxylic acid group, a sulfonic acid group, a phosphoric acid group, a phosphonic acid group and a group having at least one of an aliphatic group and an aromatic group and being substituted with at least one hydrophilic group selected from the group consisting of a carboxylic acid group, a sulfonic acid group, a phosphoric acid group, and a phosphonic acid group)

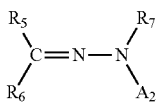
(2)

(In General Formula (2), $R_5$ and $R_6$ are, independently of each other, a hydrogen atom, a group having at least one of an aliphatic group and an aromatic group, a halogen atom, a cyano group, a nitro group, an amino group, an alkoxy group, a thioalkoxy group, an acyl group, a carboxylate ester group, an aryloxy group, a carboxylic acid group, a sulfonic acid group, a phosphoric acid group or a phosphonic acid group, with the proviso that $R_5$ and $R_6$ are not hydrogen atoms at the same time, $R_7$ is a hydrogen atom, a group having at least one of an aliphatic group and an aromatic group or a carboxylate ester group, and $A_2$ is selected from the group consisting of a carboxylic acid group, a sulfonic acid group, a phosphoric acid group, a phosphonic acid group and a group having at least one of an aliphatic group and an aromatic group and being substituted with at least one hydrophilic group selected from the group consisting of a carboxylic acid group, a sulfonic acid group, a phosphoric acid group, and a phosphonic acid group)

(3)

(In General Formula (3), $R_8$ is a cyano group or an atomic group having (i) at least one group selected from the group consisting of an ester group, an ether group, a thioether group, a ketone group and a sulfonyl group, and (ii) a group having at least one of an aliphatic group and an aromatic group, and $A_3$ represents a group having at least one of an aliphatic group and an aromatic group and being substituted with at least one hydrophilic group selected from the group consisting of a carboxylic acid group, a sulfonic acid group, a phosphoric acid group, and a phosphonic acid group)

In General Formulae (1), (2), and (3), the aliphatic group can be exemplified by an alkyl group, an alkenyl group, and an alkynyl group. The alkyl group, the alkenyl group, and the alkynyl group may be any of a linear group, a branched group, and a cyclic group. The straight or branched alkyl group, alkenyl group, or alkynyl group preferably has a carbon number of about 1 to 12. The cyclic alkyl group, alkenyl group, or alkynyl group may be either a monocyclic group or a polycyclic group, and the number of elements constituting the ring is preferably about 3 to 8. Examples of the aliphatic group include linear saturated alkyl groups such as a methyl group, an ethyl group, a propyl group, a butyl group, a pentyl group, and a hexyl group; branched saturated alkyl groups such as an isopropyl group, an isobutyl group, and a 2-ethylhexyl group; alkenyl groups such as an ethenyl group, a propenyl group, and a butenyl group; alkynyl groups such as an ethynyl group, a propynyl group, and a butynyl group; and alicyclic groups such as a cyclopropyl group, a cyclobutyl group, a cyclopentyl group, and a cyclohexyl group. The aliphatic group may have a substituent including a halogen atom such as a fluorine atom, a chlorine atom, and a bromine atom and a hydroxy group.

In General Formulae (1), (2), and (3), the aromatic group can be exemplified by an aryl group and a heteroaryl group. The aryl group and the heteroaryl group may be either a monocyclic group or a polycyclic group, and the number of elements constituting the ring is preferably about 3 to 8. Examples of the aryl group include a phenyl group, a naphthyl group, an anthracenyl group, a phenanthrenyl group, and a biphenyl group. Examples of the heteroaryl group include a pyridyl group, an imidazolyl group, a pyrazolyl group, a pyridinyl group, a thienyl group, and a thiazolyl group. Of them, a phenyl group, a naphthyl group, an anthracenyl group, a phenanthrenyl group, a biphenyl group, and a pyridinyl group are preferred, and a phenyl group and a naphthyl group are more preferred, for example.

In General Formulae (1), (2), and (3), the group having an aliphatic group and an aromatic group can be exemplified by a group having such groups as exemplified in the above directly with each other or through a typical linker structure such as —O—, —NH—, —CO—, —COO—, —CONH—, —N=N—, —SO— and —SO$_2$—. In order to increase the hydrophilicity of a functional group, the group having an aliphatic group and an aromatic group preferably has a linker structure.

In General Formulae (1) and (2), the carboxylate ester group is a group in which an aliphatic group as exemplified in the above is bonded to an ester linkage —C(=O)—O—. Examples of the carboxylate ester group include a methoxycarbonyl group, an ethoxycarbonyl group, an n-propoxycarbonyl group, an i-propoxycarbonyl group, an n-butoxycarbonyl group, and a t-butoxycarbonyl group. A carboxylate ester group may undergo ester hydrolysis during a reaction to give a corresponding hydrophilic group (optionally giving a salt or an anhydride). The ester hydrolysis is likely to be caused when heating or stirring is performed in the presence of an acid or an alkali.

Of $R_5$ and $R_6$ in General Formula (2), the halogen atom, the alkoxy group, the thioalkoxy group, the acyl group, and the aryloxy group will be described. Examples of the halogen atom include a fluorine atom, a chlorine atom, and a bromine atom. The alkoxy group is a group in which an aliphatic group as exemplified in the above is bonded to an ether bond (—O—). Examples of the alkoxy group include a methoxy group, an ethoxy group, an n-propoxy group, an i-propoxy group, an n-butoxy group, and a t-butoxy group. The thioalkoxy group is a group in which an aliphatic group as exemplified in the above is bonded to a thioether bond (—S—). Examples of the thioalkoxy group include a thiomethoxy group, a thioethoxy group, a thio-n-propoxy group, a thio-i-propoxy group, a thio-n-butoxy group, and a thio-t-butoxy group. The acyl group is a group in which an aliphatic group as exemplified in the above is bonded to a carbonyl bond (—C(=O)—). Examples of the acyl group include a formyl group, an acetyl group, an n-propionyl group, and an i-propionyl group. The aryloxy group is a group in which an aromatic group as exemplified in the above is bonded to an ether bond (—O—). Examples of the aryloxy group include a phenoxy group and a naphthoxy group.

In General Formulae (1), (2), and (3), the hydrophilic group is at least one group selected from the group consisting of a carboxylic acid group, a sulfonic acid group, a phosphoric acid group, and a phosphonic acid group. Such a hydrophilic group may be in a salt form or an anhydride form, for example, which can be present chemically. When a carboxylic acid group, a sulfonic acid group, a phosphoric acid group, and a phosphonic acid group form a salt, at least one of the protons on such a group is replaced by a cation. Examples of the cation include an alkali metal ion, an ammonium ion, and an organic ammonium ion. Examples of the alkali metal ion include ions such as a lithium ion, a sodium ion, and a potassium ion. Examples of the organic ammonium ion include cations of aliphatic amines such as mono- to tri-alkylamines; cations of aliphatic alcohol amines such as mono- to tri-alkanolamines; and salts thereof. In the aqueous ink, a salt can dissociate into ions but is expressed as "salt" for convenience.

In the compounds represented by General Formulae (1), (2), and (3), the number of hydrophilic groups as the substituent is theoretically equal to the number of hydrogen atoms present on the group having at least one of an aliphatic group and an aromatic group. For example, the number of hydrophilic groups as the substituent is 1 to 3 on a methyl group, 1 to 5 on an ethyl group, 1 to 5 on a phenyl group, 1 to 7 on a naphthyl group, 1 to 9 on an anthracenyl group, and 1 to 4 on a pyridyl group. Depending on a structure, when a single group having at least one of an aliphatic group and an aromatic group is substituted with 1 to 2 hydrophilic groups, the pigment can be self-dispersed in practice.

Surface Charge Amount

The amount of the anionic group bonded to the particle surface of a self-dispersible pigment directly or through another atomic group can be determined as the surface charge amount of the pigment. The surface charge amount can be determined by colloidal titration utilizing a potential difference. A larger value of surface charge amount indicates a larger number of the anionic groups, and a smaller value indicates a smaller number of the anionic groups. The surface charge amount of a self-dispersible pigment is represented by the amount in terms of 1 g of a solid content of the self-dispersible pigment. In the examples described later, an automatic potential-difference titrator (trade name "AT-510", manufactured by Kyoto Electronics Manufacturing) equipped with a stream potential titration unit (PCD-500) was used to determine the surface charge amount of the self-dispersible pigment in a pigment dispersion liquid by colloidal titration using a potential difference. As the titrant, methyl glycol chitosan was used. Alternatively, the self-dispersible pigment extracted from an ink by an appropriate method can be used to determine the surface charge amount.

The self-dispersible pigment preferably has a surface charge amount (mmol/g) of 0.025 mmol/g or more to 1.000 mmol/g or less. If the surface charge amount is less than 0.025 mmol/g, only a few functional groups are bonded to the pigment particle surface, and there is an excess exposed hydrophobic portion on the particle surface. On this account, even when the compound represented by General Formula (I) is contained, the exposed portion is not sufficiently covered, and this may slightly reduce the effect of improving the storage stability of an ink. If the surface charge amount is more than 1.000 mmol/g, many functional groups are bonded to the pigment particle surface, and accordingly there are many anionic groups. This is likely to cause the pigment particles to aggregate by salting out. In addition, the effect obtained by using the compound represented by General Formula (I) is unlikely to be exerted, and this may slightly reduce the effect of improving the storage stability of an ink.

Compound Represented by General Formula (I)

The aqueous ink of the present invention contains a compound represented by General Formula (I).

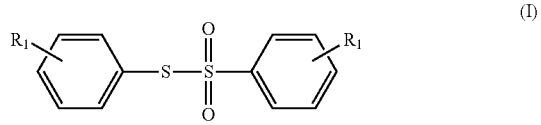

(I)

(In General Formula (I), each $R_1$ independently represents a hydrogen atom or an alkyl group.)

In General Formula (1), the alkyl group represented by $R_1$ preferably has a carbon number of 1 or more to 3 or less. Specific examples of the alkyl group include a methyl group, an ethyl group, an n-propyl group, and an isopropyl group. Of them, a methyl group is preferred. Each substitution site of two $R_1$'s is preferably a para-position on the corresponding benzene ring relative to the bonding site of the sulfur atom. Of the compounds represented by General Formula (I), (phenylsulfonyl)phenyl sulfide and S-p-tolyl p-toluenesulfonothioate are particularly preferred.

In the ink, the content of the compound represented by General Formula (I) is preferably specified by the mole number (mmol) per unit mass (kg) of the ink because a preferred range varies depending on the molecular weight. Specifically, the concentration (mmol/kg) of the compound represented by General Formula (I) in the ink is preferably 0.50 mmol/kg or more to 5.00 mmol/kg or less. If the content of the compound represented by General Formula (I) is less than 0.50 mmol/kg, the pigment particle surface cannot be sufficiently covered, and this may slightly reduce the effect of improving the storage stability of the ink. If the content of the compound represented by General Formula (I) is more than 5.00 mmol/kg, an excess amount of the compound interacts with each other to be likely to form aggregate or the like, and this may slightly reduce the effect of improving the storage stability of the ink.

The compound represented by General Formula (I) can be synthesized by a conventional procedure including oxidation, reduction, and condensation of material compounds. The synthesized product can be subjected to isolation and purification by liquid chromatography or other techniques to obtain the compound in high purity. The compound represented by General Formula (I) is not limited a compound synthesized by the above method, and a commercially available compound can also be used.

When having high affinity with a self-dispersible pigment, the compound represented by General Formula (I) is likely to come closer to the pigment particle surface and can efficiently cover the exposed portion, and this can further improve the storage stability of an ink. On this account, the functional group of the self-dispersible pigment preferably has an aromatic group as another atomic group. In addition, the functional group bonded to the pigment particle surface is preferably a phthalic acid group. The compound represented by General Formula (I) also has benzene rings, and thus when such a combination is adopted, the functional group of the self-dispersible pigment and the compound represented by General Formula (I) have a common structure to exhibit high affinity.

Salt, Water-Soluble Organic Solvent Having Dielectric Constant of 32 or Less

The aqueous ink may contain (i) a salt described later or (ii) a water-soluble organic solvent having a dielectric constant of 32 or less. When containing such a salt, the ink has a higher ion concentration, and thus the self-dispersible pigment forms loose aggregates. A water-soluble organic solvent having a low dielectric constant exhibits an action of reducing the ionic dissociation of the anionic group of a self-dispersible pigment. The ink contains water, and thus the self-dispersible pigment does not aggregate but forms loose aggregates. When a salt or a water-soluble organic solvent having a dielectric constant of 32 or less is added to the ink, the optical density of an image to be recorded can be further improved.

Salt

The salt can be exemplified by those constituted by combining such a cation and an anion as exemplified below. The cation is at least one cation selected from the group consisting of an alkali metal ion, an ammonium ion, and an organic ammonium ion. The anion is at least one anion selected from the group consisting of $Cl^-$, $Br^-$, $I^-$, $ClO^-$, $ClO_2^-$, $ClO_3^-$, $ClO_4^-$, $NO_2^-$, $NO_3^-$, $SO_4^{2-}$, $CO_3^{2-}$, $HCO_3^-$, $HCOO^-$, $(COO^-)_2$, $COOH(COO^-)$, $CH_3COO^-$, $C_2H_4(COO^-)_2$, $C_6H_5COO^-$, $C_6H_4(COO^-)_2$, $PO_4^{3-}$, $HPO_4^{2-}$, and $H_2PO_4^-$.

Examples of the alkali metal ion include a lithium ion, a sodium ion, and a potassium ion. Examples of the organic ammonium ion include cations of alkylamines having a carbon number of 1 or more to 3 or less, such as methylamine and ethylamine; and cations of alkanolamines having a carbon number of 1 or more to 4 or less, such as monoethanolamine, diethanolamine, and triethanolamine.

Examples of the salt constituted by combining a cation and an anion include $(M_2)Cl$, $(M_2)Br$, $(M_2)I$, $(M_2)ClO$, $(M_2)ClO_2$, $(M_2)ClO_3$, $(M_2)ClO_4$, $(M_2)NO_2$, $(M_2)NO_3$, $(M_2)_2SO_4$, $(M_2)_2CO_3$, $(M_2)HCO_3$, $HCOO(M_2)$ $(COO(M_2))_2$, $COOH(COO(M_2))$, $CH_3COO(M_2)$, $C_2H_4(COO(M_2))_2$, $C_6H_5COO(M_2)_2$, $C_6H_4(COO(M_2))_2$, $(M_2)_3PO_4$, $(M_2)_2HPO_4$ and $(M_2)H_2PO_4$, where $(M_2)$ is a monovalent cation. Of them, sodium acetate, sodium benzoate, potassium benzoate, ammonium benzoate, trisodium citrate, potassium phthalate, and ammonium phthalate are preferred, for example.

In the ink, the concentration (mmol/kg) of the salt is preferably 2.00 mmol/kg or more to 100.00 mmol/kg or less and more preferably 5.00 mmol/kg or more to 20.00 mmol/kg or less based on the total mass of the ink. Other than the above salts, intermolecular salts such as amino acids, taurine, and betaine compounds can be used.

Water-Soluble Organic Solvent Having Dielectric Constant of 32 or Less

In the aqueous ink, the content (% by mass) of the water-soluble organic solvent having a dielectric constant of 32 or less is preferably 0.50% by mass or more to 20.00% by mass or less and more preferably 2.00% by mass or more to 8.00% by mass or less based on the total mass of the ink.

The dielectric constants of water-soluble organic solvents and water can be determined by using a dielectric constant meter (for example, trade name "BI-870", manufactured by BROOKHAVEN INSTRUMENTS CORPORATION) at a frequency of 10 kHz. The dielectric constant of a water-soluble organic solvent that is solid at a temperature of 25° C. can be determined by measuring the dielectric constant of a 50% by mass aqueous solution and calculating the objective dielectric constant in accordance with equation (A) below. Although "water-soluble organic solvent" typically means a liquid, a solvent that is solid at 25° C. (normal temperature) is also included in the water-soluble organic solvent in the present invention.

$$\varepsilon_{sol} = 2\varepsilon_{50\%} - \varepsilon_{water} \quad (A)$$

$\varepsilon_{sol}$: dielectric constant of a water-soluble organic solvent solid at 25° C.

$\varepsilon_{50\%}$: dielectric constant of a 50% by mass aqueous solution of the water-soluble organic solvent solid at 25° C.

$\varepsilon_{water}$: dielectric constant of water

Specific examples of the water-soluble organic solvent that is generally used in aqueous inks and is solid at 25° C. include 1,6-hexanediol, trimethylolpropane, ethylene urea, urea, and polyethylene glycol having a number average molecular weight of 1,000.

The reason why the dielectric constant of a water-soluble organic solvent solid at 25° C. is calculated from the dielectric constant of a 50% by mass aqueous solution is as follows: Some of the water-soluble organic solvents that are solid at 25° C. and usable as a component of an aqueous ink are difficult to give an aqueous solution having a high concentration of more than 50% by mass. Meanwhile, the dielectric constant of an aqueous solution having a low concentration of 10% by mass or less is dominated by the dielectric constant of water. It is thus difficult to determine the probable (practical) dielectric constant value of such a water-soluble organic solvent. Hence, the inventors of the present invention have studied and found that most of the water-soluble organic solvents that are solid at 25° C. and usable in inks can give a measurable aqueous solution and the calculated dielectric constants which are consistent with the advantageous effects of the invention. For the above reason, the dielectric constant of a water-soluble organic solvent solid at 25° C. is intended to be calculated from the dielectric constant of a 50% by mass aqueous solution in the present invention. For a water-soluble organic solvent that is solid at 25° C. but has a low solubility in water and cannot give a 50% by mass aqueous solution, an aqueous solution at saturated concentration is used, and the dielectric constant is calculated in accordance with the above calculation of $\varepsilon_{sol}$ and is used expediently.

Specific examples of the water-soluble organic solvent having a dielectric constant of 32 or less include N-methyl-2-pyrrolidone (32), triethanolamine (32), diethylene glycol (32), 1,4-butanediol (31), 1,3-butanediol (30), 1,2-propanediol (29), 1,2,6-hexanetriol (29), 2-methyl-1,3-propanediol (28), 2-pyrrolidone (28), 1,5-pentanediol (27), 3-methyl-1,3-butanediol (24), 3-methyl-1,5-pentanediol (24), ethanol (24), 1-(hydroxymethyl)-5,5-dimethylhydantoin (24), triethylene glycol (23), tetraethylene glycol (21), polyethylene glycol having a number average molecular weight of 200 (19), 2-ethyl-1,3-hexanediol (19), isopropanol (18), 1,2-hexanediol (15), n-propanol (12), polyethylene glycol having a number average molecular weight of 600 (11), triethylene glycol monobutyl ether (10), tetraethylene glycol monobutyl ether (9), 1,6-hexanediol (7), and polyethylene glycol having a number average molecular weight of 1,000 (5) (the values in parentheses are dielectric constants at 25° C.). The water-soluble organic solvent having a dielectric constant of 32 or less preferably has a lower vapor pressure than that of water, at 25° C.

A water-soluble organic solvent having a lower dielectric constant is likely to affect the dispersion state of a self-dispersible pigment, depending on the molecular structure thereof. On this account, for example, when a water-soluble organic solvent that has a dielectric constant of 10 or less and is liquid at normal temperature is used, the content (% by mass) is preferably 0.50% by mass or less and more preferably 0.10% by mass or less based on the total mass of the ink. Specifically, it is particularly preferred not to use a water-soluble organic solvent that has a dielectric constant of 10 or less and is liquid at normal temperature. The water-soluble organic solvent that has a dielectric constant of 10 or less and is liquid at normal temperature is exemplified by glycol ethers.

Aqueous Medium

The aqueous ink can contain an aqueous medium that is a mixed solvent of water and a water-soluble organic solvent. As the water, deionized water or ion-exchanged water is preferably used. In the aqueous ink, the content (% by mass) of water is preferably 50.00% by mass or more to 95.00% by mass or less based on the total mass of the ink.

The water-soluble organic solvent may be any water-soluble solvent, and can be an alcohol, a polyhydric alcohol, a polyglycol, a glycol ether, a nitrogen-containing polar solvent, or a sulfur-containing polar solvent, for example. In the ink, the content (% by mass) of the water-soluble organic solvent (including the water-soluble organic solvent having a dielectric constant of 32 or less) is preferably 5.00% by mass or more to 90.00% by mass or less based on the total mass of the ink. The content is more preferably 10.00% by mass or more to 50.00% by mass or less.

Specific examples of the water-soluble organic solvent (including specific examples of the water-soluble organic solvent having a dielectric constant of 32 or less) include monohydric alcohols having 1 to 4 carbon atoms, such as methanol (33), ethanol (24), n-propanol (12), isopropanol (18), n-butanol, sec-butanol, and tert-butanol; dihydric alcohols such as 1,2-propanediol (29), 1,3-butanediol (30), 1,4-butanediol (31), 1,5-pentanediol (27), 1,2-hexanediol (15), 1,6-hexanediol (7), 2-methyl-1,3-propanediol (28), 3-methyl-1,3-butanediol (24), 3-methyl-1,5-pentanediol (24), and 2-ethyl-1,3-hexanediol (19); polyhydric alcohols such as 1,2,6-hexanetriol (29), glycerol (42), trimethylolpropane (34), and trimethylolethane; alkylene glycols such as ethylene glycol (40), diethylene glycol (32), triethylene glycol (23), tetraethylene glycol (21), butylene glycol, hexylene glycol, and thiodiglycol; glycol ethers such as diethylene glycol monomethyl ether, diethylene glycol monoethyl ether, triethylene glycol monoethyl ether, triethylene glycol monobutyl ether (10), and tetraethylene glycol monobutyl ether (9); polyalkylene glycols having a number average molecular weight of 200 to 1,000, such as polyethylene glycol having a number average molecular weight of 200 (19), polyethylene glycol having a number average molecular weight of 600 (11), polyethylene glycol having a number average molecular weight of 1,000 (5), and polypropylene glycol; nitrogen-containing compounds such as 2-pyrrolidone (28), N-methyl-2-pyrrolidone (32), 1-(2-hydroxyethyl)-2-pyrrolidone (38), 1,3-dimethyl-2-imidazolidinone, N-methylmorpholine, urea (110), ethylene urea (50), triethanolamine (32), and 1-hydroxymethyl-5,5-dimethylhydantoin (24); sulfur-containing compounds such as dimethyl sulfoxide (49) and bis(2-hydroxyethyl sulfone); and cyclic ethers such as γ-butyrolactone (42) (the values in parentheses are dielectric constants at 25° C.). The water-soluble organic solvent preferably has a dielectric constant of 3 or more. The water-soluble organic solvent preferably has a lower vapor pressure than that of water, at 25° C.

Resin

The aqueous ink can contain a resin. The resin can be added to the ink for the purpose of (i) further stabilizing the dispersion state of the self-dispersible pigment and (ii) improving the abrasion resistance of images to be recorded, for example. Even when a resin is contained, the compound represented by General Formula (I) has high hydrophobicity and a compact molecular size, and thus is substantially not thought to be prevented from being adsorbed to the self-dispersible pigment by the resin. In the ink, the content (% by mass) of the resin is preferably 0.10% by mass or more to 10.00% by mass or less and more preferably 1.00% by mass or more to 5.00% by mass or less based on the total mass of the ink.

As the resin, a resin having an anionic group is preferred. Specific examples of the resin include acrylic resins, polyester resins, urethane resins, urea resins, polysaccharides, and polypeptides. Of them, acrylic resins and urethane resins are preferred because the ejection stability of the ink is readily achieved. The structure of the resin is exemplified by a block copolymer, a random copolymer, a graft copolymer, and combinations of them.

The resin in the aqueous ink may be in a dissolved state in an aqueous medium or in a dispersed state as resin particles in an aqueous medium. In the present invention, the water-soluble resin is a resin that does not form such particles that the particle diameter thereof can be determined by dynamic light scattering when the resin is neutralized with an equivalent amount of an alkali to the acid value. The resin preferably has an acid value of 30 mg KOH/g or more to 350 mg KOH/g or less. The resin preferably has a weight average molecular weight (weight average molecular weight determined by gel permeation chromatography in terms of polystyrene) of 1,000 or more to 100,000 or less and more preferably 5,000 or more to 50,000 or less.

Dye

The aqueous ink can further contain a dye as a coloring material for toning and the like in addition to the self-dispersible pigment. The dye is not limited to particular types. Specific examples of the dye include direct dyes, acid dyes, basic dyes, disperse dyes, and food dyes, and a dye having an anionic group is preferably used. Specific examples of the dye skeleton include azo, triphenylmethane, phthalocyanine, azaphthalocyanine, xanthene, and anthrapyridone. A dye having a hue common to the self-dispersible pigment is preferably used, where the hue is classified into black, cyan, magenta, yellow, red, blue, and green. In the ink, the content (% by mass) of the dye is preferably 0.20% by mass or more to 8.00% by mass or less and more preferably 0.50% by mass or more to 3.00% by mass or less based on the total mass of the ink.

Other Additives

The ink of the present invention can contain various additives such as a surfactant, a pH adjuster, an anticorrosive, an antiseptic agent, an antifungal agent, an evaporation accelerator, an antioxidant, a reduction inhibitor, an evaporation accelerator, and a chelating agent, as needed.

Examples of the surfactant include anionic, cationic, and nonionic surfactants. In the ink, the content (% by mass) of the surfactant is preferably 0.10% by mass or more to 5.00% by mass or less and more preferably 0.10% by mass or more to 2.00% by mass or less based on the total mass of the ink.

As the surfactant, a nonionic surfactant such as polyoxyethylene alkyl ethers, polyoxyethylene fatty acid esters, polyoxyethylene alkyl phenyl ethers, polyoxyethylene/polyoxypropylene block copolymers, and acetylene glycol compounds is preferably used. The hydrophobic group of the surfactant is likely to be adsorbed to the particle surface of a self-dispersible pigment. Hence, the dispersion state of the self-dispersible pigment in the ink can be stably maintained. This is because the nonionic surfactant amongst the surfactants has no ionic group and thus is unlikely to interact with the functional group of the self-dispersible pigment but is likely to be adsorbed to the pigment particle surface. Even when a nonionic surfactant is present, the compound represented by General Formula (I) has high hydrophobicity and a compact molecular size, and thus is hardly thought to be prevented from being adsorbed to the self-dispersible pigment by the surfactant. When an ionic surfactant is used, the content (% by mass) thereof is preferably 0.10% by mass or less and more preferably 0.05% by mass or less based on the total mass of the ink. Specifically, it is particularly preferred not to use the ionic surfactant.

Physical Properties of Ink

The aqueous ink of the present invention is an ink applied to an ink jet system. Hence, the physical property values thereof are preferably controlled to appropriate values. Specifically, the ink preferably has a surface tension of 10 mN/m or more to 60 mN/m or less and more preferably 20 mN/m or more to 60 mN/m or less at 25° C. More specifically, the surface tension is preferably 30 mN/m or more to 50 mN/m or less and particularly preferably 30 mN/m or more to 40 mN/m or less. The ink preferably has a viscosity of 1.0 mPa·s or more to 10.0 mPa·s or less, more preferably 1.0 mPa·s or more to 5.0 mPa·s or less, and particularly preferably 1.0 mPa·s or more to 3.0 mPa·s or less at 25° C. The ink preferably has a pH of 5.0 or more to 10.0 or less at 25° C. Specifically, the pH is preferably 6.0 or more to 8.5 or less. When the pH is within this range, the dispersion stability of the self-dispersible pigment is improved and the solubility of the compound represented by General Formula (I) is ensured. Hence, the ink obtains excellent storage stability.

Reaction Liquid

The aqueous ink of the present invention can be used in combination with a reaction liquid. The reaction liquid causes a self-dispersible pigment to aggregate when coming into contact with an ink, and contains a reactant. Examples of the reactant include a cationic component such as a polyvalent metal ion and a cationic resin, and an organic acid.

Examples of the polyvalent metal ion include divalent metal ions such as $Ca^{2+}$, $Cu^{2+}$, $Ni^{2+}$, $Mg^{2+}$, $Zn^{2+}$, $Sr^{2+}$, and $Ba^{2+}$; and trivalent metal ions such as $Al^{3+}$, $Fe^{3+}$, $Cr^{3+}$, and $Y^{3+}$. To add a polyvalent metal ion to the reaction liquid, a polyvalent metal salt (which can be a hydrate) constituted by combining a polyvalent metal ion with an anion can be used. Examples of the anion include inorganic anions such as $Cl^-$, $Br^-$, $I^-$, $ClO^-$, $ClO_2^-$, $ClO_3^-$, $ClO_4^-$, $NO_2^-$, $NO_3^-$, $SO_4^{2-}$, $CO_3^{2-}$, $HCO_3^-$, $PO_4^{3-}$, $HPO_4^{2-}$, and $H_2PO_4^-$; and organic anions such as $HCOO^-$, $(COO^-)_2$, $COOH(COO^-)$, $CH_3COO^-$, $C_2H_4(COO^-)_2$, $C_6H_5COO^-$, $C_6H_4(COO^-)_2$, and $CH_3SO_3^-$. When a polyvalent metal ion is used as the reactant, the content (% by mass) in terms of polyvalent metal salt in the reaction liquid is preferably 1.00% by mass or more to 10.00% by mass or less based on the total mass of the reaction liquid.

Examples of the cationic resin include a resin having a primary to tertiary amine structure and a resin having a quaternary ammonium salt structure. Specific examples include resins having a structure such as vinylamine, allylamine, vinylimidazole, vinylpyridine, dimethylaminoethyl methacrylate, ethyleneimine, and guanidine. In order to improve the solubility in the reaction liquid, the cationic resin may be used in combination with an acidic compound, or the cationic resin may be subjected to quaternarization treatment. When a cationic resin is used as the reactant, the content (% by mass) of the cationic resin in the reaction liquid is preferably 1.00% by mass or more to 10.00% by mass or less based on the total mass of the reaction liquid.

The reaction liquid containing an organic acid has a buffer capacity in an acidic region (less than pH 7.0, preferably pH 2.0 to pH 5.0), thus makes the anionic group of the self-dispersible pigment in an ink be in an acid form, and causes the self-dispersible pigment to aggregate. Examples of the organic acid include a monocarboxylic acid such as formic acid, acetic acid, propionic acid, and butyric acid and salts thereof; a dicarboxylic acid such as phthalic acid, isophthalic acid, terephthalic acid, oxalic acid, malonic acid, succinic acid, glutaric acid, adipic acid, maleic acid, fumaric acid, itaconic acid, sebacic acid, dimer acid, and pyromellitic acid and salts and hydrogen salts thereof; a tricarboxylic acid such as citric acid and trimellitic acid and salts and hydrogen salts thereof; and a hydroxycarboxylic acid such as oxysuccinic acid, DL-malic acid, and tartaric acid and salts thereof. Examples of the cation forming a salt include an alkali metal ion such as a lithium ion, a sodium ion, and a potassium ion; an ammonium ion; and an organic ammonium ion. In the reaction liquid, the content (% by mass) of the organic acid is preferably 1.00% by mass or more to 40.00% by mass or less based on the total mass of the reaction liquid.

In addition to the reactant, the reaction liquid can contain water, a water-soluble organic solvent, other additives, and the like that are substantially the same as those exemplified above as the components usable in the aqueous ink.

Clear Ink

The aqueous ink of the present invention can also be used in combination with a clear ink containing no coloring material. The clear ink is applied onto the image recorded with an ink containing a coloring material. The clear ink is used in order to improve properties (glossiness, abrasion resistance, and the like) of the image recorded with an ink containing a coloring material, for example. The clear ink contains no coloring material but can contain water, a water-soluble organic solvent, other additives, and the like that are substantially the same as those exemplified above as the components usable in the aqueous ink.

Ink Cartridge

The ink cartridge of the present invention includes an ink and an ink storage portion that stores the ink. The ink stored in the ink storage portion is the above-described ink of the present invention. FIG. 1 is a schematic sectional view illustrating an embodiment of the ink cartridge of the present invention. As shown in FIG. 1, the bottom face of the ink cartridge has an ink supply port 12 for supplying the ink to a recording head. The inside of the ink cartridge is an ink storage portion for storing the ink. The ink storage portion includes an ink storage chamber 14 and an absorber storage chamber 16, and the ink storage chamber 14 and the absorber storage chamber 16 communicate with each other through a communication hole 18. The absorber storage chamber 16 communicates with the ink supply port 12. The ink storage chamber 14 stores a liquid ink 20. The absorber storage chamber 16 stores absorbers 22 and 24 that are impregnated with the ink to hold the ink. The ink storage portion does not necessarily have the ink storage chamber that stores a liquid ink, and can be a portion in which all the ink stored is held by absorbers. The ink storage portion does not necessarily have absorbers, and can be a portion that stores all the ink in a liquid state. The ink storage portion may be integrated with a recording head to form an ink cartridge.

Ink Jet Recording Method

The ink jet recording method of the present invention is a method in which the above-described ink of the present invention is ejected from an ink jet recording head to record an image on a recording medium. The system for ejecting the ink is exemplified by a system of applying mechanical energy to the ink and a system of applying thermal energy to the ink. In the present invention, a system of applying thermal energy to an ink to eject the ink is particularly preferably adopted. The ink jet recording method can include known steps except that the ink of the present invention is used.

Figure 2A:
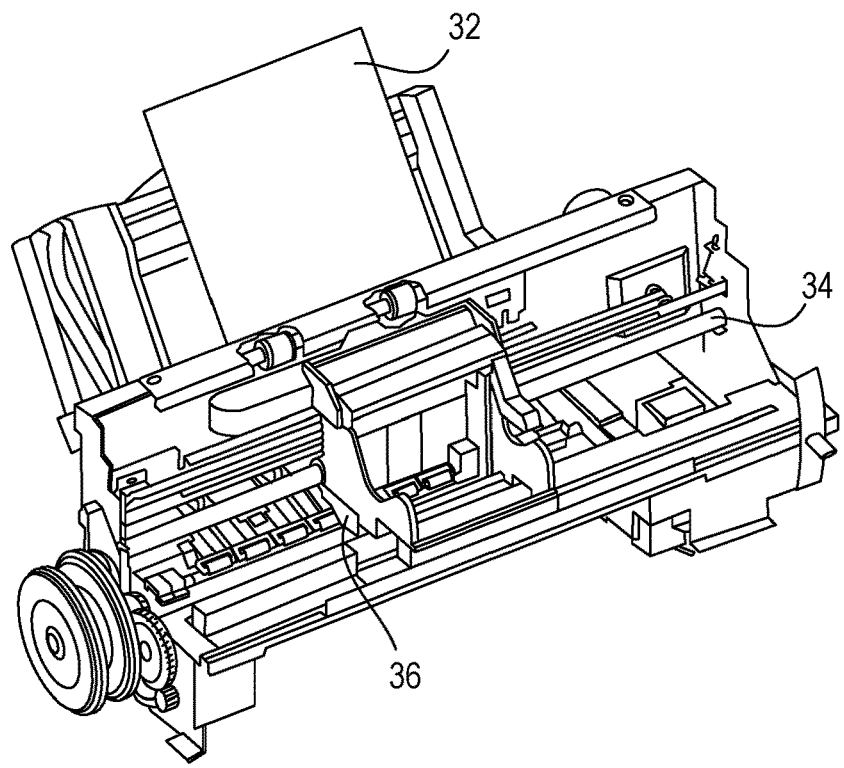
FIGS. 2A and 2B are schematic views illustrating an exemplary ink jet recording apparatus used for an ink jet recording method of the present invention.
Figure 2B:
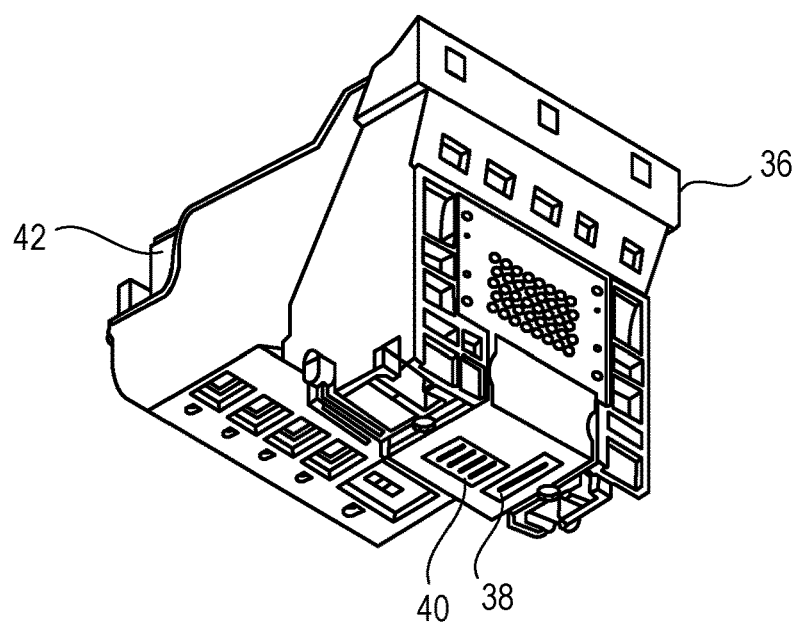

FIGS. 2A and 2B are schematic views illustrating an exemplary ink jet recording apparatus used for the ink jet recording method of the present invention; FIG. 2A is a perspective view of a principal part of the ink jet recording apparatus; and FIG. 2B is a perspective view of a head cartridge. The ink jet recording apparatus includes a conveyance unit (not illustrated) for conveying a recording medium 32 and a carriage shaft 34. On the carriage shaft 34, a head cartridge 36 can be set. The head cartridge 36 includes recording heads 38 and 40 and is so constructed that an ink cartridge 42 is set. Inks (not illustrated) are ejected toward the recording medium 32 from the recording heads 38 and 40 while the head cartridge 36 is being carried in a main scanning direction along the carriage shaft 34. The recording medium 32 is then conveyed in a sub scanning direction by the conveyance unit (not illustrated), whereby an image is recorded on the recording medium 32.

Examples

The present invention will next be described in further detail with reference to examples and comparative examples, but the invention is not intended to be limited to the following examples without departing from the scope of the invention. The component amounts with "part" or "%" are based on mass unless otherwise noted.

Preparation of Pigment Dispersion Liquid (Measurement Method of Surface Charge Amount of Self-Dispersible Pigment)

An automatic potential-difference titrator (trade name "AT-510", manufactured by Kyoto Electronics Manufacturing) equipped with a stream potential titration unit (PCD-500) was used to determine the surface charge amount of the self-dispersible pigment in a pigment dispersion liquid by potentiometric titration using methyl glycol chitosan as the titrant.

Pigment Dispersion Liquid 1

A solution prepared by dissolving 5.0 g of concentrated hydrochloric acid in 5.5 g of water was cooled to 5° C., and 1.6 g of 4-aminophthalic acid (treatment agent) was added to the solution. The container containing the solution was placed in an ice bath, and to the solution being stirred to maintain the temperature at 10° C. or less, a solution prepared by dissolving 1.8 g of sodium nitrite in 9.0 g of ion-exchanged water at 5° C. was added. After stirring for 15 minutes, 6.0 g of a pigment (carbon black, trade name "NIPex 170IQ", manufactured by Orion Engineered Carbons, a BET specific surface area of 200 $m^2$/g, a DBP oil absorption amount of 135 mL/100 g) was added under stirring, and the whole was further stirred for 15 minutes, giving a slurry. The obtained slurry was filtered through a filter paper (trade name "Standard filter paper No. 2", manufactured by ADVANTEC), and the particles were thoroughly washed with water and dried in an oven at 110° C. Sodium ions as the counter ions were replaced with potassium ions by an ion exchange method, and then an appropriate amount of ion-exchanged water was added to adjust the pigment content, giving a pigment dispersion liquid 1 having a pigment content of 15.0%. The self-dispersible pigment in the pigment dispersion liquid 1 had a surface charge amount of 0.340 mmol/g.

Pigment Dispersion Liquid 2

A solution prepared by dissolving 5.0 g of concentrated hydrochloric acid in 5.5 g of water was cooled to 5° C., and 1.6 g of 4-aminophthalic acid (treatment agent) was added to the solution. The container containing the solution was placed in an ice bath, and to the solution being stirred to maintain the temperature at 10° C. or less, a solution prepared by dissolving 1.8 g of sodium nitrite in 9.0 g of ion-exchanged water at 5° C. was added. After stirring for 15 minutes, 6.0 g of a pigment (carbon black, trade name "NIPex 170IQ", manufactured by Orion Engineered Carbons, a BET specific surface area of 200 $m^2$/g, a DBP oil absorption amount of 135 mL/100 g) was added under stirring, and the whole was further stirred for 15 minutes, giving a slurry. An 8 mol/L aqueous solution of potassium hydroxide was then added to adjust the liquid pH to 10, giving a dispersion liquid. An ultrafiltration apparatus (trade name "RP-2100" manufactured by Eyela) and a filter (a pencil-shaped module "SAP-0013", manufactured by Asahi Kasei Chemicals) were used to remove impurities from the dispersion liquid for purification. The purification was performed by the following procedure: The dispersion liquid was concentrated to 20 mL with the ultrafiltration apparatus (180 mL of filtrate was removed); then 180 mL of ion-exchanged water was added to dilute the dispersion liquid; this operation was repeated 4 times; and the filtrate was confirmed to have an electrical conductivity of 50 µS/cm or less. Sodium ions as the counter ions were replaced with ammonium ions by an ion exchange method. After the ion exchange, the liquid was centrifuged at a rotation speed of 5,000 rpm for 30 minutes to remove coarse particles, and then an appropriate amount of ion-exchanged water was added to adjust the pigment content, giving a pigment dispersion liquid 2 having a pigment content of 15.0%. The self-dispersible pigment in the pigment dispersion liquid 2 had a surface charge amount of 0.340 mmol/g.

Pigment Dispersion Liquid 3

A pigment dispersion liquid 3 having a pigment content of 15.0% was prepared in the same manner as in the preparation of the pigment dispersion liquid 1 except that the pigment was changed to C.I. Pigment Blue 15:3 (trade name "Heliogen Blue D7079", manufactured by BASF). The self-dispersible pigment in the pigment dispersion liquid 3 had a surface charge amount of 0.190 mmol/g.

Pigment Dispersion Liquid 4

In a vessel with a volume of 400 mL (manufactured by Aimex), 18.0 g of a pigment, 180 g of ion-exchanged water, and 1.0 mmol/g of a treatment agent (relative to the amount of the pigment) were put and mixed. As the pigment, carbon black (trade name "NIPex 170IQ", manufactured by Orion Engineered Carbons, a BET specific surface area of 200 $m^2$/g, a DBP oil absorption amount of 135 mL/100 g) was used. As the treatment agent, 4-(2-tert-butoxycarbonylhydrazino)phthalic acid (manufactured by Sumika Technoservice) was used. This treatment agent is a compound represented by General Formula (1) in which $R_1$ and $R_3$ are a hydrogen atom, $R_2$ is a tert-butyl carboxylate group, and $A_1$ is a 3,4-dicarboxyphenyl group. An 8 mol/L aqueous solution of potassium hydroxide was added to adjust the liquid pH to 3, and then the liquid was stirred at 25° C. at a rotation speed of 2,000 rpm for 12 hours. An 8 mol/L aqueous solution of potassium hydroxide was then added to adjust the liquid pH to 10, giving a dispersion liquid. An ultrafiltration apparatus (trade name "RP-2100" manufactured by Eyela) and a filter (a pencil-shaped module "SAP-0013", manufactured by Asahi Kasei Chemicals) were used to remove impurities from the dispersion liquid for purification. The purification was performed by the following procedure: The dispersion liquid was concentrated to 20 mL with the ultrafiltration apparatus (180 mL of filtrate was removed); then 180 mL of ion-exchanged water was added to dilute the dispersion liquid; this operation was repeated 4 times; and the filtrate was confirmed to have an electrical conductivity of 50 µS/cm or less. After the purification, the liquid was centrifuged at a rotation speed of 5,000 rpm for 30 minutes to remove coarse particles, giving a pigment dispersion liquid 4 having a pigment content of 10.0%. The self-dispersible pigment in the pigment dispersion liquid 4 had a surface charge amount of 0.260 mmol/g.

Pigment Dispersion Liquid 5

As materials, 4-aminophthalic acid (manufactured by Tokyo Chemical Industry Co., Ltd.) and p-benzenesulfonyl chloride (manufactured by Tokyo Chemical Industry Co., Ltd.) were prepared. The p-benzenesulfonyl chloride was twice as much as the amount of the 4-aminophthalic acid (molar ratio). These prepared materials were used to obtain 4-(1,2-bisphenylsulfonylhydrazino)phthalic acid in accordance with the description in International Publication No. WO 2001/002351. This compound is a compound represented by General Formula (1) in which $R_1$ is a hydrogen atom, $R_2$ and $R_3$ are a phenylsulfonyl group, and $A_1$ is a 3,4-dicarboxyphenyl group. The same procedure as for the pigment dispersion liquid 4 was performed except that the treatment agent was changed to 4-(1,2-bisphenylsulfonylhydrazino)phthalic acid, giving a pigment dispersion liquid 5 having a pigment content of 15.0%. The self-dispersible pigment in the pigment dispersion liquid 5 had a surface charge amount of 0.250 mmol/g.

Pigment Dispersion Liquid 6

A pigment dispersion liquid 6 having a pigment content of 15.0% was prepared in the same manner as for the pigment dispersion liquid 4 except that the treatment agent was changed to acetone 3,4-dicarboxyphenylhydrazone (manufactured by WDB Functional Chemistry). This treatment agent is a compound represented by General Formula (2) in which $R_5$ and $R_6$ are each a methyl group, $R_7$ is a hydrogen atom, and $A_2$ is a 3,4-dicarboxyphenyl group. The self-dispersible pigment in the pigment dispersion liquid 6 had a surface charge amount of 0.240 mmol/g.

Pigment Dispersion Liquid 7

A pigment dispersion liquid 7 having a pigment content of 15.0% was prepared in the same manner as for the pigment dispersion liquid 4 except that the treatment agent was changed to 4-(phenylsulfonylazo)phthalic acid (manufactured by WDB Functional Chemistry). This treatment agent is a compound represented by General Formula (3) in which $R_8$ is a phenylsulfonyl group and $A_3$ is a 3,4-dicarboxyphenyl group. The self-dispersible pigment in the pigment dispersion liquid 7 had a surface charge amount of 0.250 mmol/g.

Pigment Dispersion Liquid 8

With reference to the description of "Example 3" in Japanese Patent Application Laid-Open No. 2003-535949, the particle surface of a pigment was oxidized with ozone gas to prepare a self-dispersible pigment. Specifically, the pigment was first, preliminary dispersed in ion-exchanged water and then was treated with ozone for 6 hours. As the pigment, carbon black (trade name "NIPex 170IQ", manufactured by Orion Engineered Carbons, a BET specific surface area of 200 $m^2$/g, a DBP oil absorption amount of 135 mL/100 g) was used. Next, while potassium hydroxide was added to adjust the pH of the mixture to about 7, the mixture was circulated for 3 hours with a liquid-liquid collision type disperser. An appropriate amount of ion-exchanged water was added to adjust the pigment content, giving a pigment dispersion liquid 8 having a pigment content of 10.0%. The self-dispersible pigment in the pigment dispersion liquid 8 had a surface charge amount of 0.320 mmol/g.

Pigment Dispersion Liquid 9

A commercially available pigment dispersion liquid (trade name "BONJET BLACK CW-1", manufactured by Orient Chemical Industries) containing a self-dispersible pigment produced by oxidation of the particle surface of a pigment (carbon black) with an oxidant was used as a pigment dispersion liquid 9. The pigment dispersion liquid 9 had a pigment content of 20.0%, and the self-dispersible pigment had a surface charge amount of 0.330 mmol/g.

Pigment Dispersion Liquid 10

A commercially available pigment dispersion liquid (trade name "Aqua-Black 162", manufactured by Tokai Carbon) containing a self-dispersible pigment produced by oxidation of the particle surface of a pigment (carbon black) with an oxidant was used as a pigment dispersion liquid 10. The pigment dispersion liquid 10 had a pigment content of 19.0%, and the self-dispersible pigment had a surface charge amount of 0.320 mmol/g.

Pigment Dispersion Liquid 11

A solution prepared by dissolving 5.0 g of concentrated hydrochloric acid in 5.5 g of water was cooled to 5° C., and 0.16 g of 4-aminophthalic acid (treatment agent) was added to the solution. The container containing the solution was placed in an ice bath, and to the solution being stirred to maintain the temperature at 10° C. or less, a solution prepared by dissolving 0.18 g of sodium nitrite in 9.0 g of ion-exchanged water at 5° C. was added. After stirring for 15 minutes, 6.0 g of a pigment (carbon black, trade name "NIPex 170IQ", manufactured by Orion Engineered Carbons, a BET specific surface area of 200 $m^2$/g, a DBP oil absorption amount of 135 mL/100 g) was added under stirring, and the whole was further stirred for 2 minutes. An aqueous solution of potassium hydroxide was added to quench the diazonium compound generated by the reaction of the treatment agent with sodium nitrite. After that, the same procedure as for the pigment dispersion liquid 1 was performed, giving a pigment dispersion liquid 11 having a pigment content of 15.0%. The self-dispersible pigment in the pigment dispersion liquid 11 had a surface charge amount of 0.020 mmol/g.

Pigment Dispersion Liquid 12

A pigment dispersion liquid 12 having a pigment content of 15.0% was prepared in the same manner as for the pigment dispersion liquid 11 except that the stirring time after the addition of the pigment was 2 minutes. The self-dispersible pigment in the pigment dispersion liquid 12 had a surface charge amount of 0.025 mmol/g.

Pigment Dispersion Liquid 13

Before the drying in an oven, the same procedure as for the pigment dispersion liquid 1 was performed except that 2.0 g of 5-amino-1,2,3-benzenetricarboxylic acid was used as the treatment agent. Then, 2.0 g of 5-amino-1,2,3-benzenetricarboxylic acid was used to repeat the same treatment. The treatment was repeated 4 times, and then the same procedure as for the pigment dispersion liquid 1 was performed, giving a pigment dispersion liquid 13 having a pigment content of 15.0%. The self-dispersible pigment in the pigment dispersion liquid 13 had a surface charge amount of 1.000 mmol/g.

Pigment Dispersion Liquid 14

A pigment dispersion liquid 14 having a pigment content of 15.0% was prepared in the same manner as for the pigment dispersion liquid 13 except that the treatment with the treatment agent was repeated 8 times. The self-dispersible pigment in the pigment dispersion liquid 14 had a surface charge amount of 1.050 mmol/g.

Pigment Dispersion Liquid 15

First, 20.0 parts of a pigment, 8.0 parts of an acrylic resin (trade name "Joncryl 683", manufactured by BASF, an acid value of 160 mg KOH/g), 1.0 part of potassium hydroxide, and 71.0 parts of ion-exchanged water were mixed to give a mixture. As the pigment, carbon black (trade name "NIPex 170IQ", manufactured by Orion Engineered Carbons, a BET specific surface area of 200 m²/g, a DBP oil absorption amount of 135 mL/100 g) was used. The obtained mixture was placed in a paint shaker together with glass beads and dispersed for 8 hours. The resulting mixture was subjected to centrifugal separation to remove coarse particles, then the resin that had not been adsorbed to the pigment was removed by ultrafiltration, and ion-exchanged water was added. The resulting liquid was subjected to pressure filtration through a microfilter with a pore size of 3.0 μm (manufactured by Fujifilm), and then an aqueous solution of potassium hydroxide was used to adjust the pH. An appropriate amount of ion-exchanged water was added to adjust the pigment content, giving a pigment dispersion liquid 15 having a pigment content of 15.0% and an acrylic resin content of 6.0%. The pigment dispersed by the resin in the pigment dispersion liquid 15 had a surface charge amount of 0.39 mmol/g.

Pigment Dispersion Liquid 16

First, 20.0 parts of a pigment, 4.0 parts of sodium naphthalene sulfonate formaldehyde condensate (trade name "DEMOL N", manufactured by Kao), and 76.0 parts of ion-exchanged water were mixed to give a mixture. The same procedure as for the pigment dispersion liquid 15 was performed except that the above mixture was used, giving a pigment dispersion liquid 16 having a pigment content of 15.0% and a sodium naphthalene sulfonate formaldehyde condensate content of 3.0%. The pigment dispersed by the dispersant in the pigment dispersion liquid 16 had a surface charge amount of 0.33 mmol/g. The surface charge amount was calculated by conversion of the elementary analysis value of sulfur.

Preparation of Resin Aqueous Solution

In a beaker with a volume of 200 mL, 10.0 parts of an acrylic resin (trade name "Joncryl 683", manufactured by BASF), 1.0 part of potassium hydroxide, and 70.0 parts of ion-exchanged water were placed and stirred at 50° C. for 2 hours, and the resin was dissolved. The solution was subjected to pressure filtration through a microfilter with a pore size of 0.2 μm (manufactured by Fujifilm), and then an aqueous solution of potassium hydroxide was added to adjust the pH. An appropriate amount of ion-exchanged water was further added, giving a resin aqueous solution having an acrylic resin content of 10.0%.

Preparation of Ink

The components (unit: %) shown in the upper part in Table 1 were mixed and thoroughly stirred, and the mixture was subjected to pressure filtration through a membrane filter with a pore size of 2.5 μm (trade name "HDCII Filter", manufactured by Pall), giving the corresponding ink. The amount of ion-exchanged water was such a residual amount that the total amount of the components is 100.00%. In Table 1, "Acetylenol E100" is the trade name of a nonionic surfactant (ethylene oxide adduct of acetylene glycol) manufactured by Kawaken Fine Chemicals. The numerical values in the parentheses suffixed to water-soluble organic solvents are the dielectric constants of the corresponding water-soluble organic solvents. In the lower part in Table 1, the concentrations A (mmol/kg) of compounds represented by General Formula (I) are shown.

TABLE 1

Compositions and properties of inks

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| Pigment dispersion liquid 1 | 20.00 | | | | | | | 20.00 | 20.00 | 20.00 | |
| Pigment dispersion liquid 2 | | 20.00 | | | | | | | | | |
| Pigment dispersion liquid 3 | | | 20.00 | | | | | | | | |
| Pigment dispersion liquid 4 | | | | 30.00 | | | | | | | |
| Pigment dispersion liquid 5 | | | | | 30.00 | | | | | | |
| Pigment dispersion liquid 6 | | | | | | 30.00 | | | | | |
| Pigment dispersion liquid 7 | | | | | | | 30.00 | | | | |
| Pigment dispersion liquid 8 | | | | | | | | | | | 30.00 |
| Pigment dispersion liquid 9 | | | | | | | | | | | |
| Pigment dispersion liquid 10 | | | | | | | | | | | |
| Pigment dispersion liquid 11 | | | | | | | | | | | |
| Pigment dispersion liquid 12 | | | | | | | | | | | |
| Pigment dispersion liquid 13 | | | | | | | | | | | |
| Pigment dispersion liquid 14 | | | | | | | | | | | |
| Pigment dispersion liquid 15 | | | | | | | | | | | |
| Pigment dispersion liquid 16 | | | | | | | | | | | |
| C.I. Direct Blue 199 | | | | | | | | | | 0.30 | |
| C.I. Acid Black 1 | | | | | | | | | | | |

TABLE 1-continued

Compositions and properties of inks

|  |  |  |  |  |  |  |  |  |  |  |  |
|---|---|---|---|---|---|---|---|---|---|---|---|
| (Phenylsulfonyl)phenyl sulfide | 0.025 | 0.025 | 0.025 | 0.025 | 0.025 | 0.025 | 0.025 | 0.025 | 0.025 |  | 0.025 |
| S-p-Tolyl p-toluenesulfonothioate |  |  |  |  |  |  |  |  |  | 0.025 |  |
| Phenyl benzoate |  |  |  |  |  |  |  |  |  |  |  |
| Diphenyldisulfide |  |  |  |  |  |  |  |  |  |  |  |
| S-Methyl benzenethiosulfone |  |  |  |  |  |  |  |  |  |  |  |
| Diphenylsulfone |  |  |  |  |  |  |  |  |  |  |  |
| Ammonium phthalate | 0.20 | 0.20 | 0.20 | 0.20 | 0.20 | 0.20 | 0.20 | 0.20 | 0.20 | 0.20 | 0.20 |
| Potassium sulfate |  |  |  |  |  |  |  |  |  |  |  |
| Glycerol (42) | 12.00 | 12.00 | 12.00 | 12.00 | 12.00 | 12.00 | 12.00 | 12.00 | 12.00 | 12.00 | 12.00 |
| Trimethylolpropane (34) |  |  |  |  |  |  |  |  |  |  |  |
| Diethylene glycol (32) |  |  |  |  |  |  |  |  |  |  |  |
| 2-Pyrrolidone (28) | 2.00 | 2.00 | 2.00 | 2.00 | 2.00 | 2.00 | 2.00 | 2.00 | 2.00 | 2.00 | 2.00 |
| Triethylene glycol (23) | 5.00 | 5.00 | 5.00 | 5.00 | 5.00 | 5.00 | 5.00 | 5.00 | 5.00 | 5.00 | 5.00 |
| 1,2-Hexanediol (15) | 1.00 | 1.00 | 1.00 | 1.00 | 1.00 | 1.00 | 1.00 | 1.00 | 1.00 | 1.00 | 1.00 |
| Resin aqueous solution |  |  |  |  |  |  |  | 15.00 | 15.00 |  |  |
| Acetylenol E100 | 0.15 | 0.15 | 0.15 | 0.15 | 0.15 | 0.15 | 0.15 | 0.15 | 0.15 | 0.15 | 0.15 |
| Ion-exchanged water | Balance | Balance | Balance | Balance | Balance | Balance | Balance | Balance | Balance | Balance | Balance |
| Concentration A of General Formula (I) (mmol/kg) | 1.00 | 1.00 | 1.00 | 1.00 | 1.00 | 1.00 | 1.00 | 1.00 | 1.00 | 0.90 | 1.00 |

|  | Example | | | | | | | | | | |
|---|---|---|---|---|---|---|---|---|---|---|---|
|  | 12 | 13 | 14 | 15 | 16 | 17 | 18 | 19 | 20 | 21 | 22 |
| Pigment dispersion liquid 1 |  |  |  |  |  |  |  | 20.00 | 20.00 | 20.00 | 20.00 | 20.00 |
| Pigment dispersion liquid 2 |  |  |  |  |  |  |  |  |  |  |  |
| Pigment dispersion liquid 3 |  |  |  |  |  |  |  |  |  |  |  |
| Pigment dispersion liquid 4 |  |  |  |  |  |  |  |  |  |  |  |
| Pigment dispersion liquid 5 |  |  |  |  |  |  |  |  |  |  |  |
| Pigment dispersion liquid 6 |  |  |  |  |  |  |  |  |  |  |  |
| Pigment dispersion liquid 7 |  |  |  |  |  |  |  |  |  |  |  |
| Pigment dispersion liquid 8 |  |  |  |  |  |  |  |  |  |  |  |
| Pigment dispersion liquid 9 | 15.00 |  |  |  |  |  |  |  |  |  |  |
| Pigment dispersion liquid 10 |  | 15.79 |  |  |  |  |  |  |  |  |  |
| Pigment dispersion liquid 11 |  |  | 20.00 |  |  |  |  |  |  |  |  |
| Pigment dispersion liquid 12 |  |  |  | 20.00 |  |  |  |  |  |  |  |
| Pigment dispersion liquid 13 |  |  |  |  | 20.00 |  |  |  |  |  |  |
| Pigment dispersion liquid 14 |  |  |  |  |  | 20.00 |  |  |  |  |  |
| Pigment dispersion liquid 15 |  |  |  |  |  |  |  |  |  |  |  |
| Pigment dispersion liquid 16 |  |  |  |  |  |  |  |  |  |  |  |
| C.I. Direct Blue 199 |  |  |  |  |  |  |  |  |  |  |  |
| C.I. Acid Black 1 |  |  |  |  |  |  |  |  |  |  |  |
| (Phenylsulfonyl)phenyl sulfide | 0.025 | 0.025 | 0.025 | 0.025 | 0.025 | 0.025 | 0.012 | 0.014 | 0.120 | 0.130 | 0.025 |
| S-p-Tolyl p-toluenesulfonothioate |  |  |  |  |  |  |  |  |  |  |  |
| Phenyl benzoate |  |  |  |  |  |  |  |  |  |  |  |
| Diphenyldisulfide |  |  |  |  |  |  |  |  |  |  |  |
| S-Methyl benzenethiosulfone |  |  |  |  |  |  |  |  |  |  |  |
| Diphenylsulfone |  |  |  |  |  |  |  |  |  |  |  |
| Ammonium phthalate | 0.20 | 0.20 | 0.20 | 0.20 | 0.20 | 0.20 | 0.20 | 0.20 | 0.20 | 0.20 |  |
| Potassium sulfate |  |  |  |  |  |  |  |  |  |  |  |
| Glycerol (42) | 12.00 | 12.00 | 12.00 | 12.00 | 12.00 | 12.00 | 12.00 | 12.00 | 12.00 | 12.00 | 12.00 |
| Trimethylolpropane (34) |  |  |  |  |  |  |  |  |  |  |  |
| Diethylene glycol (32) |  |  |  |  |  |  |  |  |  |  |  |

TABLE 1-continued

| Compositions and properties of inks | | | | | | | | | | | |
|---|---|---|---|---|---|---|---|---|---|---|---|
| 2-Pyrrolidone (28) | 2.00 | 2.00 | 2.00 | 2.00 | 2.00 | 2.00 | 2.00 | 2.00 | 2.00 | 2.00 | 2.00 |
| Triethylene glycol (23) | 5.00 | 5.00 | 5.00 | 5.00 | 5.00 | 5.00 | 5.00 | 5.00 | 5.00 | 5.00 | 5.00 |
| 1,2-Hexanediol (15) | 1.00 | 1.00 | 1.00 | 1.00 | 1.00 | 1.00 | 1.00 | 1.00 | 1.00 | 1.00 | 1.00 |
| Resin aqueous solution | | | | | | | | | | | |
| Acetylenol E100 | 0.15 | 0.15 | 0.15 | 0.15 | 0.15 | 0.15 | 0.15 | 0.15 | 0.15 | 0.15 | 0.15 |
| Ion-exchanged water | Balance | Balance | Balance | Balance | Balance | Balance | Balance | Balance | Balance | Balance | Balance |
| Concentration A of General Formula (I) (mmol/kg) | 1.00 | 1.00 | 1.00 | 1.00 | 1.00 | 1.00 | 0.48 | 0.56 | 4.79 | 5.19 | 1.00 |

| | Example | | | | | | | | | Reference Example | |
|---|---|---|---|---|---|---|---|---|---|---|---|
| | 23 | 24 | 25 | 26 | 27 | 28 | 29 | 30 | 31 | 1 | 2 |
| Pigment dispersion liquid 1 | 20.00 | 20.00 | 20.00 | 20.00 | 20.00 | 20.00 | 20.00 | 20.00 | | | |
| Pigment dispersion liquid 2 | | | | | | | | | | | |
| Pigment dispersion liquid 3 | | | | | | | | | | | |
| Pigment dispersion liquid 4 | | | | | | | | | | | |
| Pigment dispersion liquid 5 | | | | | | | | | | | |
| Pigment dispersion liquid 6 | | | | | | | | | | | |
| Pigment dispersion liquid 7 | | | | | | | | | | | |
| Pigment dispersion liquid 8 | | | | | | | | | | | |
| Pigment dispersion liquid 9 | | | | | | | | | 30.00 | | |
| Pigment dispersion liquid 10 | | | | | | | | | | | |
| Pigment dispersion liquid 11 | | | | | | | | | | | |
| Pigment dispersion liquid 12 | | | | | | | | | | | |
| Pigment dispersion liquid 13 | | | | | | | | | | | |
| Pigment dispersion liquid 14 | | | | | | | | | | | |
| Pigment dispersion liquid 15 | | | | | | | | | | 20.00 | 20.00 |
| Pigment dispersion liquid 16 | | | | | | | | | | | |
| C.I. Direct Blue 199 | | | | | | | | | | | |
| C.I. Acid Black 1 | | | | | | | | | | | |
| (Phenylsulfonyl)phenyl sulfide | 0.025 | 0.025 | 0.025 | 0.025 | 0.025 | 0.025 | 0.025 | 0.025 | | 0.025 | |
| S-p-Tolyl p-toluenesulfonothioate | | | | | | | | | 0.013 | | |
| Phenyl benzoate | | | | | | | | | | | |
| Diphenyldisulfide | | | | | | | | | | | |
| S-Methyl benzenethiosulfone | | | | | | | | | | | |
| Diphenylsulfone | | | | | | | | | | | |
| Ammonium phthalate | | 0.20 | 0.20 | 0.20 | 0.20 | 0.20 | 0.20 | | | 0.20 | 0.20 |
| Potassium sulfate | 0.16 | | | | | | | | | | |
| Glycerol (42) | 12.00 | 20.00 | | | | | | 12.00 | 20.00 | 12.00 | 12.00 |
| Trimethylolpropane (34) | | | 20.00 | | | | | 8.00 | | | |
| Diethylene glycol (32) | | | | 20.00 | | | | | | | |
| 2-Pyrrolidone (28) | 2.00 | | | | 20.00 | | | | | 2.00 | 2.00 |
| Triethylene glycol (23) | 5.00 | | | | | 20.00 | 15.00 | | | 5.00 | 5.00 |
| 1,2-Hexanediol (15) | 1.00 | | | | | | 5.00 | | | 1.00 | 1.00 |
| Resin aqueous solution | | | | | | | | | | | |
| Acetylenol E100 | 0.15 | 0.15 | 0.15 | 0.15 | 0.15 | 0.15 | 0.15 | 0.15 | | 0.15 | 0.15 |
| Ion-exchanged water | Balance | Balance | Balance | Balance | Balance | Balance | Balance | Balance | Balance | Balance | Balance |
| Concentration A of General Formula (I) (mmol/kg) | 1.00 | 1.00 | 1.00 | 1.00 | 1.00 | 1.00 | 1.00 | 1.00 | 0.47 | 1.00 | 0.00 |

| | Comparative Example | | | | | | | | | | |
|---|---|---|---|---|---|---|---|---|---|---|---|
| | 1 | 2 | 3 | 4 | 5 | 6 | 7 | 8 | 9 | 10 | 11 |
| Pigment dispersion liquid 1 | 20.00 | 20.00 | 20.00 | 20.00 | 20.00 | 20.00 | | | | 45.00 | 30.00 |
| Pigment dispersion liquid 2 | | | | | | | | | | | |

TABLE 1-continued

Compositions and properties of inks

| | 1 | 2 | 3 | 4 | 5 | 6 | 7 | 8 | 9 | 10 | 11 |
|---|---|---|---|---|---|---|---|---|---|---|---|
| Pigment dispersion liquid 3 | | | | | | | | | | 20.00 | |
| Pigment dispersion liquid 4 | | | | | | | | | | | |
| Pigment dispersion liquid 5 | | | | | | | | | | | |
| Pigment dispersion liquid 6 | | | | | | | | | | | |
| Pigment dispersion liquid 7 | | | | | | | | | | | |
| Pigment dispersion liquid 8 | | | | | | | | | | | |
| Pigment dispersion liquid 9 | | | | | | | | | | | |
| Pigment dispersion liquid 10 | | | | | | | | | | | |
| Pigment dispersion liquid 11 | | | | | | | | | | | |
| Pigment dispersion liquid 12 | | | | | | | | | | | |
| Pigment dispersion liquid 13 | | | | | | | | | | | |
| Pigment dispersion liquid 14 | | | | | | | | | | | |
| Pigment dispersion liquid 15 | | | | | | | | | | | |
| Pigment dispersion liquid 16 | | | | | | | 20.00 | 20.00 | | | |
| C.I. Direct Blue 199 | | | | | | | | | | | |
| C.I. Acid Black 1 | | | | | | 0.30 | | | | | |
| (Phenylsulfonyl)phenyl sulfide | | | | | | | | 0.025 | | | |
| S-p-Tolyl p-toluenesulfonothioate | | | | | | | | | | | |
| Phenyl benzoate | 0.020 | | | | | | | | | | |
| Diphenyldisulfide | | 0.020 | | | | | | | | | |
| S-Methyl benzenethiosulfone | | | 0.020 | | | | | | | | |
| Diphenylsulfone | | | | | 0.020 | | | | | | |
| Ammonium phthalate | 0.20 | 0.20 | 0.20 | 0.20 | 0.20 | 0.20 | 0.20 | 0.20 | 0.20 | | |
| Potassium sulfate | | | | | | | | | | | 1.00 |
| Glycerol (42) | 12.00 | 12.00 | 12.00 | 12.00 | 12.00 | 12.00 | 12.00 | 12.00 | 12.00 | 10.00 | 6.00 |
| Trimethylolpropane (34) | | | | | | | | | | | 6.00 |
| Diethylene glycol (32) | | | | | | | | | | | 6.00 |
| 2-Pyrrolidone (28) | 2.00 | 2.00 | 2.00 | 2.00 | 2.00 | 2.00 | 2.00 | 2.00 | 2.00 | | |
| Triethylene glycol (23) | 5.00 | 5.00 | 5.00 | 5.00 | 5.00 | 5.00 | 5.00 | 5.00 | 5.00 | 5.00 | |
| 1,2-Hexanediol (15) | 1.00 | 1.00 | 1.00 | 1.00 | 1.00 | 1.00 | 1.00 | 1.00 | 1.00 | | |
| Resin aqueous solution | | | | | | | | | | | |
| Acetylenol E100 | 0.15 | 0.15 | 0.15 | 0.15 | 0.15 | 0.15 | 0.15 | 0.15 | 0.15 | 0.10 | 0.20 |
| Ion-exchanged water | Balance | Balance | Balance | Balance | Balance | Balance | Balance | Balance | Balance | Balance | Balance |
| Concentration A of General Formula (I) (mmol/kg) | 0.00 | 0.00 | 0.00 | 0.00 | 0.00 | 0.00 | 0.00 | 1.00 | 0.00 | 0.00 | 0.00 |

Evaluation

The number of coarse particles, $D_{ini}$ (×10$^7$), in each ink prepared above was counted. After the counting, the ink was placed in a closed container and stored at a temperature of 80° C. for one month, and then the number of coarse particles, $D_{aft}$ (×10$^7$), in the ink was counted. The number of coarse particles (the number of particles having a particle diameter of 500 nm or more) in an ink was determined by using a particle counting type particle size distribution analyzer (trade name "Accusizer 780 APS", manufactured by Particle Sizing Systems). The rate of change of coarse particles, C, was calculated in accordance with the following equation, and the storage stability of an ink was evaluated. In the present invention, a sample having a rate of change of 3.0 or less was regarded as an acceptable level, and a sample having a rate of change of more than 3.0 was regarded as an unacceptable level. A smaller rate of change C indicates better storage stability of an ink. In the present invention, a sample having a rate of change C of 3.0 or less is determined to have sufficient storage stability applicable to the ink jet recording method. The evaluation results are shown in Table 2.

Rate of change $C = D_{aft}/D_{ini}$

Optical Density

Each ink obtained above was filled in an ink cartridge, and the ink cartridge was set in an ink jet recording apparatus (trade name "PIXUS MP480", manufactured by Canon) equipped with a recording head that ejects an ink by thermal energy. In the examples, the solid image recorded under conditions where an ink having a weight of 25 ng±10% is applied to a unit area of 1/600 inch×1/600 inch is defined as "a recording duty of 100%". A solid image (2 cm×2 cm/line) having a recording duty of 100% was recorded on a recording medium (plain paper, trade name "Canon Plain Paper, White SW-101", manufactured by Canon). One day after the recording, a reflection densitometer (trade name "Macbeth RD-918", manufactured by Macbeth) was used to determine the optical density of the solid image, and the optical density of the image was evaluated based on the following criteria. In the present invention, a sample evaluated as "A" or "B" was regarded as an acceptable level, and a sample evaluated as "C" was regarded as an unacceptable level. The evaluation results are shown in Table 2.

A: the optical density was 1.50 or more.
B: the optical density was not less than 1.40 and less than 1.50.
C: the optical density was less than 1.40.

TABLE 2

Evaluation results

|  |  | $D_{ini}$ (*$10^7$) | $D_{aft}$ (*$10^7$) | Rate of change C (%) | Optical density |
|---|---|---|---|---|---|
| Example | 1 | 4.0 | 5.5 | 1.4 | A |
|  | 2 | 3.6 | 4.7 | 1.3 | A |
|  | 3 | 40.0 | 91.0 | 2.3 | B |
|  | 4 | 3.8 | 5.9 | 1.6 | A |
|  | 5 | 3.0 | 4.2 | 1.4 | A |
|  | 6 | 4.3 | 6.4 | 1.5 | A |
|  | 7 | 6.0 | 10.0 | 1.7 | A |
|  | 8 | 6.1 | 10.3 | 1.7 | A |
|  | 9 | 6.1 | 17.0 | 2.8 | A |
|  | 10 | 3.2 | 4.6 | 1.4 | A |
|  | 11 | 4.2 | 8.9 | 2.1 | A |
|  | 12 | 6.0 | 15.0 | 2.5 | A |
|  | 13 | 5.0 | 13.0 | 2.6 | A |
|  | 14 | 4.6 | 12.0 | 2.6 | A |
|  | 15 | 4.7 | 11.0 | 2.3 | A |
|  | 16 | 4.5 | 9.2 | 2.0 | A |
|  | 17 | 4.2 | 11.0 | 2.6 | A |
|  | 18 | 4.0 | 9.0 | 2.3 | A |
|  | 19 | 4.0 | 8.1 | 2.0 | A |
|  | 20 | 4.0 | 8.2 | 2.1 | A |
|  | 21 | 4.0 | 9.1 | 2.3 | A |
|  | 22 | 3.5 | 4.8 | 1.4 | A |
|  | 23 | 3.3 | 4.8 | 1.5 | A |
|  | 24 | 4.0 | 4.9 | 1.2 | A |
|  | 25 | 4.0 | 5.3 | 1.3 | A |
|  | 26 | 4.0 | 8.2 | 2.1 | A |
|  | 27 | 4.2 | 9.5 | 2.3 | A |
|  | 28 | 4.5 | 11.0 | 2.4 | A |
|  | 29 | 4.8 | 12.0 | 2.5 | A |
|  | 30 | 3.6 | 4.4 | 1.2 | B |
|  | 31 | 4.2 | 7.9 | 1.9 | B |
| Reference Example | 1 | 4.0 | 6.2 | 1.6 | C |
|  | 2 | 4.0 | 7.5 | 1.9 | C |
| Comparative Example | 1 | 4.1 | 15.0 | 3.7 | A |
|  | 2 | 4.0 | 14.0 | 3.5 | A |
|  | 3 | 4.1 | 21.0 | 5.1 | A |
|  | 4 | 4.3 | 14.0 | 3.3 | A |
|  | 5 | 4.2 | 15.0 | 3.6 | A |
|  | 6 | 4.1 | 15.0 | 3.7 | A |
|  | 7 | 4.0 | 7.1 | 1.8 | C |
|  | 8 | 4.0 | 6.5 | 1.6 | C |
|  | 9 | 42.0 | 250.0 | 6.0 | A |
|  | 10 | 4.2 | 13.5 | 3.2 | A |
|  | 11 | 6.0 | 32.0 | 5.3 | A |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-255631, filed Dec. 28, 2015, which is hereby incorporated by reference herein in its entirety.

What is claimed is:

1. An aqueous ink for ink jet comprising:
   a self-dispersible pigment; and
   a compound represented by General Formula (I):

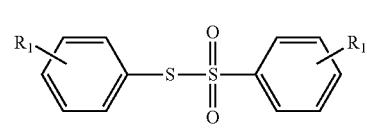

wherein, in General Formula (I), each $R_1$ independently represents a hydrogen atom or an alkyl group.

2. The aqueous ink according to claim 1, wherein the self-dispersible pigment comprises a self-dispersible pigment having an anionic group that is bonded to a particle surface of the pigment through another atomic group.

3. The aqueous ink according to claim 1, wherein a surface charge amount (mmol/g) of the self-dispersible pigment is 0.025 mmol/g or more to 1.000 mmol/g or less.

4. The aqueous ink according to claim 1, wherein a concentration (mmol/kg) of the compound represented by General Formula (I) is 0.50 mmol/kg or more to 5.00 mmol/kg or less.

5. The aqueous ink according to claim 1, wherein a pigment species of the self-dispersible pigment is carbon black.

6. The aqueous ink according to claim 1, further comprising at least one component of (i) a salt constituted by combining at least one cation selected from the group consisting of an alkali metal ion, an ammonium ion, and an organic ammonium ion with at least one anion selected from the group consisting of $Cl^-$, $Br^-$, $I^-$, $ClO^-$, $ClO_2^-$, $ClO_3^-$, $ClO_4^-$, $NO_2^-$, $NO_3^-$, $SO_4^{2-}$, $CO_3^{2-}$, $HCO_3^-$, $HCOO^-$, $(COO^-)_2$, $COOH(COO^-)$, $CH_3COO^-$, $C_2H_4(COO^-)_2$, $C_6H_5COO^-$, $C_6H_4(COO^-)_2$, $PO_4^{3-}$, $HPO_4^{2-}$, and $H_2PO_4^-$ and (ii) a water-soluble organic solvent having a dielectric constant of 32 or less.

7. An ink cartridge comprising:
   an ink; and
   an ink storage portion that stores the ink,
   wherein the ink comprises the aqueous ink according to claim 1.

8. An ink jet recording method comprising:
   ejecting an ink from an ink jet recording head to record an image on a recording medium,
   wherein the ink comprises the aqueous ink according to claim 1.

9. The aqueous ink according to claim 1, wherein the content (% by mass) of the self-dispersible pigment is 0.10% by mass or more to 15.00% by mass or less based on the total mass of the ink.

10. The aqueous ink according to claim 2, wherein the anionic group comprises a carboxylic acid group.

11. The aqueous ink according to claim 1, wherein the self-dispersible pigment comprises a self-dispersible pigment having a phthalic acid group bonded to a particle surface of the pigment.

* * * * *